(12) United States Patent
Schwarz

(10) Patent No.: US 6,746,795 B2
(45) Date of Patent: Jun. 8, 2004

(54) LEAD-ACID SAFETY BATTERY CAP

(76) Inventor: William R. Schwarz, 10031 Freeman Ave., Santa Fe Springs, CA (US) 90670

( * ) Notice: Subject to any disclaimer, the term of this patent is extended or adjusted under 35 U.S.C. 154(b) by 0 days.

(21) Appl. No.: 09/881,515

(22) Filed: Jun. 14, 2001

(65) Prior Publication Data

US 2001/0031390 A1 Oct. 18, 2001

Related U.S. Application Data

(63) Continuation-in-part of application No. 09/236,453, filed on Jan. 25, 1999, now abandoned, which is a continuation-in-part of application No. 08/978,693, filed on Nov. 26, 1997, now abandoned.

(51) Int. Cl.$^7$ ................................................ H01M 2/12
(52) U.S. Cl. ............................................ 429/86; 429/89
(58) Field of Search .................... 429/86, 89; 220/303, 220/373

(56) References Cited

U.S. PATENT DOCUMENTS

| | | | | |
|---|---|---|---|---|
| 1,505,693 A | * | 8/1924 | Benner et al. ............. | 429/86 X |
| 1,898,718 A | | 2/1933 | Dunzweiler ................... | 429/89 |
| 2,214,803 A | | 9/1940 | Wells .......................... | 429/89 |
| 2,687,448 A | * | 8/1954 | Gulick et al. ................. | 429/86 |
| 2,937,223 A | | 5/1960 | Thompson ................... | 429/89 |
| 3,033,911 A | | 5/1962 | Duddy | |
| 3,108,911 A | | 10/1963 | Miller ......................... | 429/89 |
| 3,507,708 A | | 4/1970 | Vignaud | |
| 3,879,227 A | * | 4/1975 | Hennen ....................... | 429/86 |
| 3,915,752 A | | 10/1975 | Gross ......................... | 429/86 |
| 4,219,612 A | | 8/1980 | Tatlock ........................ | 429/86 |
| 4,400,450 A | | 8/1983 | Wagner ....................... | 429/86 |
| 4,517,262 A | * | 5/1985 | Beidler ..................... | 429/89 X |
| 4,636,446 A | | 1/1987 | Lee ........................... | 429/86 X |
| 5,108,853 A | | 4/1992 | Feres ......................... | 429/86 |
| 5,132,175 A | | 7/1992 | Mrotek et al. ................ | 429/86 |
| 5,209,992 A | | 5/1993 | Feres ......................... | 429/86 |
| 5,407,760 A | * | 4/1995 | Kasner et al. ............ | 429/89 X |
| 5,422,199 A | | 6/1995 | Adams et al. ............ | 429/89 X |

FOREIGN PATENT DOCUMENTS

EP 856897 * 5/1998 ............ H01M/2/12

* cited by examiner

Primary Examiner—Stephen J. Kalafut
(74) Attorney, Agent, or Firm—Charles H. Thomas

(57) ABSTRACT

A battery cap is provided for engagement in a fill port of a cell of a deep cycle, lead-acid electrical storage battery. The battery cap is formed of a hollow, tubular body having an upper end with an expansive mouth opening, and a lower end at which a transverse floor extends radially inwardly. The floor includes a central, annular convex downwardly projecting portion that defines a central fluid passage opening. The interior of the tubular wall defines a radially inwardly projecting flame arrester seat spaced from both the upper and lower ends of the body. A pair of gas escape ports are defined in the tubular wall between the flame arrester seat and the mouth opening. A diverter is located in the lower portion of the tubular body beneath a disc shaped micropore filter that serves as the flame arrester and which is seated on the flame arrester seat. The diverter is formed with a generally disc shaped, horizontal plate having diametrically opposed notches at its peripheral edge and a pair of legs of that have an arcuate cross-section and which rest upon the floor to partially surround the central opening in the floor. A battery cap having this internal structure causes drops of electrolyte to intermittently lodge in the central floor opening, thereby forming a temporary fluid seal that is repeatedly broken to allow venting of gas and re-established to aid in protecting the micropore filter from contaminants.

18 Claims, 4 Drawing Sheets

LEAD-ACID SAFETY BATTERY CAP

The present application is a continuation in part of U.S. application Ser. No. 09/236,453 filed Jan. 25, 1999, now abandoned, which is a continuation in part of U.S. application Ser. No. 08/978,693 filed Nov. 26, 1997, now abandoned.

BACKGROUND OF THE INVENTION

1. Field of the Invention

The present invention relates to battery caps for insertion into fill ports of a lead-acid storage battery, particularly deep cycle, high charge and high discharge batteries of the type utilized on golf carts and other battery powered vehicles.

2. Description of the Prior Art

A typical lead-acid battery consists of a plurality of cells filled with aqueous sulfuric acid electrolyte. The cells employ negative plates using lead as the electroactive material and positive plates in which lead oxide is the electroactive material. Sets of an equal number of positive and negative plates in the electrolyte are referred to as cells. Each lead-acid cell produces two volts per cell. The assembly of several cells in a series circuit to produce a higher voltage is called a battery.

Each cell in a battery has a fill opening which requires a battery cap. The purpose of the fill opening is to provide an opening for electrolyte filling and water replacement. The fill opening also provides a path to vent gas that is produced during charging and discharging of the battery.

The purpose of the battery cap is to prevent the electrolyte from spilling or spewing from the battery cells. The sulfuric acid battery electrolyte is highly caustic and can cause injury to persons upon contact, eat holes in clothing and other fabric materials, and rapidly corrode metal if it is ejected from the battery. Therefore, it is highly desirable to prevent electrolyte from escaping the battery case. During charging a battery generates bubbles within the acid that can and do spew electrolyte from the battery unless precautions are taken. Conventional prior art battery caps are therefore equipped with splash guards, baffles and other devices designed to recover and return to the battery cells electrolyte spewed from the battery.

Lead-acid cell batteries have intrinsic hazards. It is well known that lead-acid storage batteries utilized on motor vehicles emit potentially explosive gases during charging and discharging. During the normal course of charging and discharging a battery, a potentially explosive mixture of oxygen and hydrogen is liberated. A conventional battery cap is not a solid structure, but is typically hollow and includes one or more passageways to vent the mixture of oxygen and hydrogen from the battery compartment to the atmosphere at a slow rate. This process is referred to as off-gassing.

An inherent danger that accompanies the off gassing process is the possibility that a spark, flash or flame might enter the battery cell through the vent passageway of a battery cap. If this occurs the volatile, explosive gases are ignited within the battery, whereupon the battery will explode. If this happens acid and battery fragments are thrown through the air. When this occurs damage to the battery compartment is very likely, and the risk of personal injury is quite great.

Because of the risk of personal injury and property damage that may occur, original equipment manufacturers (OEM's) and battery distributors have insisted in recent years that battery caps utilized on batteries with which they deal must be APF (flame retardant approved). This is achieved by utilizing a microporous disc as a flame barrier in each battery cap. This microporous disc acts as a spark or flame arrester.

One problem created by porous disc spark arresters is the "loading" or destruction of the porosity of the microporous filter from suspended particulate contamination carried by the gas bubbles during off gassing. Such contaminants do not pass through the microporous filter but are instead loaded into the open pores of the porous disc. As a result of this process the porosity of the filter disc is reduced from its design specifications. As this occurs internal battery gas pressure rises. As pressure increases above and beyond atmospheric pressure, battery acid is spewed through a conventional battery cap and into a battery compartment. This results in a loss of electrolyte which, when it escapes the battery, is likely to cause injury or damage.

Also, the buildup of gas pressure within a battery alters the "battery envelope". That is, gas pressure buildup within a battery alters the outside dimensions of the battery. The battery bulges and can damage the battery compartment. Also, unless pressure is relieved the battery can crack and leak electrolyte.

In the past battery caps have been designed to attempt to solve these problems. In some cases the porous disc is protected by splash guards. Examples of battery caps constructed in this way are described, for example, in U.S. Pat. Nos. 5,422,199; 5,209,992; 4,400,450; and 5,132,175. Also, some battery caps have been designed with labyrinth paths. Examples of these types of battery caps are found in U.S. Pat. Nos. 5,132,175; 5,209,992; and 5,422,199. In other battery caps special types of chambers have been constructed. Examples of these appear in U.S. Pat. Nos. 4,400,450; 5,132,175 and 5,422,199.

Some conventional battery caps perform satisfactorily when utilized on relatively shallow cycle batteries of the type employed for ignition in a gasoline or diesel fuel powered vehicle. However, until the present invention battery caps employing microporous disc spark or flame arresters have not been feasible for use with the high charge and high discharge batteries required as the sole power source for vehicles such as golf carts, warehouse forklifts and other such vehicles. Some of the deep cycle batteries suitable for such vehicles are sold with the trade designations 250's, L16's, J185's, and Scrubbers.

The introduction of the widespread requirement for spark and flame arresters has created a new set of problems in lead-acid electrical storage batteries. One of these problems is the interruption of the natural equilibrium of the internal gas pressure within a battery cell and the outside atmosphere. This imbalance in equilibrium is made progressively worse by the deterioration of the porous disc spark or flame arrester. This deterioration results from the agglomeration of particulate contaminants in the porous disc that are carried in the aqueous electrolyte solution.

During the usual charging and discharging cycle of a battery the negative lead plates and positive lead oxide plates of the battery gradually erode. Particles from the heavy-metal plates are carried into the aqueous sulfuric acid electrolyte as dissolved, particulate matter. These particles eventually precipitate to the bottom of the battery. This byproduct is called "mud" in the battery industry.

During agitation and jostling of the battery that occurs as a battery powered vehicle travels, the particles of "mud" are carried into suspension in the electrolyte. These particles are ultimately transported to the microporous flame arrester by gas bubbles created in the electrolyte during charging and discharging and by spewing electrolyte.

SUMMARY OF THE INVENTION

One important object of the present invention is to provide a battery cap which does incorporate a spark or flame arrester for used in a deep charge, lead-acid electrical storage battery of the type used to power golf carts, forklifts and similar vehicles.

A related object of the invention is to provide a battery cap that solves the problem of pressure buildup and envelope expansion in deep cycle lead-acid electrical storage batteries.

In one broad aspect the present invention may be considered to be a battery cap for insertion into a fill port of a cell of a lead-acid electrical storage battery comprising a hollow, tubular body, a diverter located within the tubular body, a flame arrester located within the tubular body above the diverter, and a top end closure.

The tubular body is a hollow, barrel shaped body having upper and lower ends. It is formed with an upright, annular wall having an exterior configured to engage a battery fill port. The wall has a first snap fit engaging element on its inner surface at the upper end of the body. The upper end of the body defines a circular mouth opening. An annular, transverse floor extends radially inwardly from the wall at the lower end of the body. The floor includes a central, annular downwardly bulging portion perforated by a central fluid passage opening therein. The wall also defines a radially inwardly projecting flame arrester seat located between the upper and lower ends of the body. The wall further defines a plurality of laterally spaced gas escape ports beneath the mouth opening, The diverter is located within said body and is formed with a transverse plate having fluid passageways at its periphery. A plurality of upright plate supports are formed as segments of an upright hollow cylinder, and extend downwardly from the transverse plate. The plate supports define radial fluid passage gaps therebetween. The plate supports rest upon the floor of the body and straddle the central, fluid passage opening and hold the transverse plate directly above the downwardly bulging portion of the floor at a location spaced above the floor.

The porous flame arrester is disposed upon the flame arrester seat and extends across the interior of the tubular body and resides in contact with the interior surface of the upright wall throughout its circumference.

The top end closure disc has a second snap fit engaging element at its periphery. The first snap fit engaging element at the top of the wall and the second snap fit engaging element on the top end closure disc are engaged with each other at the top end of the body to hold the top end closure disc engaged with the wall to block the circular mouth opening of the body.

Preferably, the interior of the wall is formed with a radially inwardly projecting diverter engaging ring. The diverter engaging ring is located between the floor and the flame arrester seat. The area between the floor and the flame arrester seat thereby forms a diverter cavity.

The diverter is formed of plastic and is entrapped in the diverter cavity by the diverter engaging ring. The diverter plate is preferably formed in a disc shaped configuration with a pair of diametrically opposed notches in its periphery. The spaces between the structure of the plate at the notches and the interior of the wall form the peripheral fluid passageways.

The plastic of which the diverter is formed is stiff, but is sufficiently resilient so that the edges of the diverter plate will flex so that they clear the diverter engaging ring as the diverter is pressed downwardly toward the floor of the tubular body. As the configuration and are entrapped beneath the diverter engaging ring. The diameter of the diverter plate is just slightly greater than the inner diameter of the hollow area across the tubular body encompassed within the diverter engaging ring.

Preferably also the top end closure disc has a concealed inner surface facing the flame arrester and a finger projecting from the concealed inner surface toward the flame arrester. This longitudinally projecting finger resides in contact with the flame arrester when the snap fit engaging elements on the upper end of the wall and the top end closure are engaged with each other. The finger thereby serves as a means for preventing the top end closure disc from being forced too far down into the tubular body. The finger also serves to hold the porous flame arrester in position against the flame arrester seat. The flame arrester seat may be formed as an upwardly facing, annular bearing ledge by a radially inwardly extending ring shaped projection from the interior of the wall of the tubular body.

A pair of gas escape ports are located side-by-side at the same longitudinal distance along the axis of longitudinal alignment of the tubular body from the top end closure disc. The gas escape ports are located in laterally spaced separation from each other in the wall between the end closure disc and the flame arrester. The gas escape ports serve to allow gases to escape from the battery cells, thus avoiding gas pressure buildup within the battery cells.

In another broad aspect the invention may be considered to be a battery cap for a fill port of a cell of a lead-acid electrical storage battery. The battery cap of the invention is comprised of a hollow, tubular body formed with top and bottom ends and an upright tubular wall. The wall has an exterior and an interior surrounding a central axis of longitudinal alignment. The exterior of the wall is configured to engage the fill port. The upper extremity of the interior of the wall forms an upper mouth opening at the top end of the tubular body. A lower end closure floor is formed at the bottom end of the tubular body at the lower extremity of the wall. A pair of laterally spaced gas escape ports are defined through the wall below the upper mouth opening.

The interior of the wall forms a flame arrester seat located between the floor and the pair of gas escape ports. The floor has a central, annular portion centered on the axis of longitudinal alignment. This central, annular portion has a convex downwardly bulging exterior end face. A central, circular fluid passage opening is defined through the central annular portion of the floor.

A diverter is located within the tubular body and has a plate oriented perpendicular to the axis of longitudinal alignment. The diverter plate has peripheral fluid passageways at its periphery. Upright supports project downwardly from the plate. The supports are shaped as arcuately curved segments of an upright cylinder centered on the axis of longitudinal alignment. The upright supports rest upon the floor at the central annular portion thereof to hold the plate in spaced separation from the floor directly above the central annular portion of the floor. The supports define a pair of diametrically opposed, radial fluid passage gaps therebetween, A transverse, porous flame arrester is located above the diverter and below the pair of gas escape ports. The flame arrester resides in contact with the wall throughout the interior thereof. A body end closure blocks the upper mouth opening and is secured to the wall at the top end of the body in interlocking engagement therewith.

The invention may be described with greater clarity and particularity by reference to the accompanying drawings.

DESCRIPTION OF THE EMBODIMENT

Figure 1:
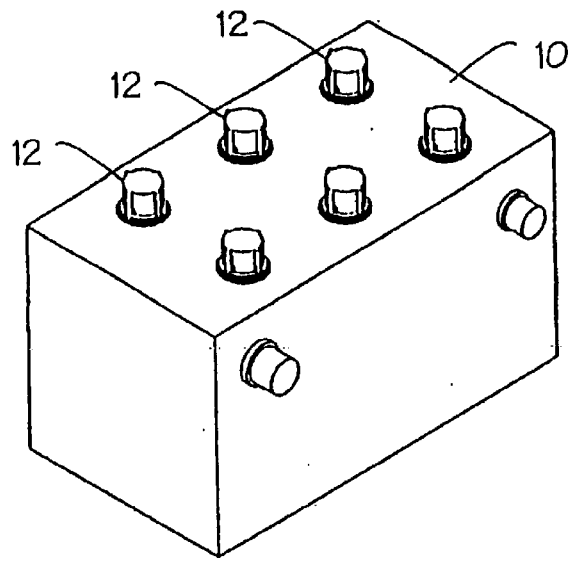
FIG. 1 is a perspective view of a conventional deep cycle, lead-acid electrical storage battery equipped with detachable conventional battery caps.

FIG. 1 illustrates a conventional, heavy duty, deep cycle lead-acid electrical storage battery 10 of the type utilized in vehicles powered solely by battery power. For example, a deep cycle battery 10 may be utilized to power a golf cart, a warehouse forklift, a wheelchair or some other mobile vehicle operated solely by battery power.

Figure 2:
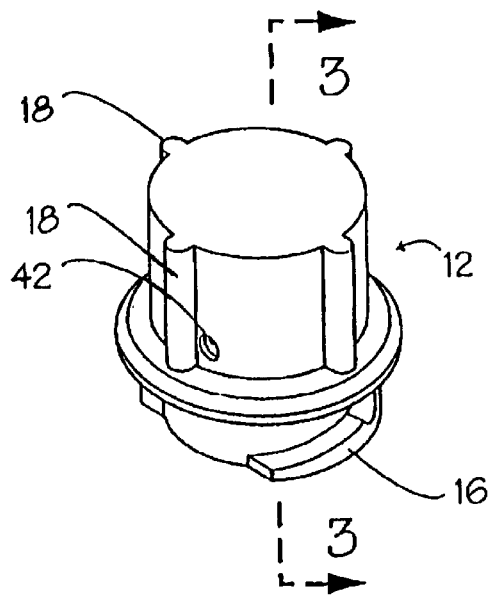
FIG. 2 is a perspective view of a conventional, detachable battery cap of the type employed in the battery of FIG. 1.

The battery 10 illustrated has six cells, each of which has a fill opening that is closed by a conventional battery cap 12. A single one of the battery caps 12 is illustrated in detail in FIGS. 2 and 3. The battery cap 12 is formed of stiff plastic that defines an upper portion of 14 and a lower portion 16. Four wings or vanes 18 spaced 90 degrees apart project radially from the otherwise cylindrical body of the upper portion 14. The wings or vanes 18 enable a user to grasp the cap 12 and twist it counterclockwise to remove it from the fill opening of a battery or clockwise to reattach it into a fill opening in the battery 10. The lower portion 16 of the battery cap 12 is configured with radially projecting inclined planes that engage corresponding recesses in a fill opening of the battery 10.

An annular, radially projecting flange 20 is formed around the cap 12 at the delineation between the upper and lower portions 14 and 16. A gasket 22 is located under the flange 20. The gasket 22 forms a tight seal against the structure of the battery 10 when the cap 12 is tightly installed in a fill opening in the battery 10.

Figure 3:
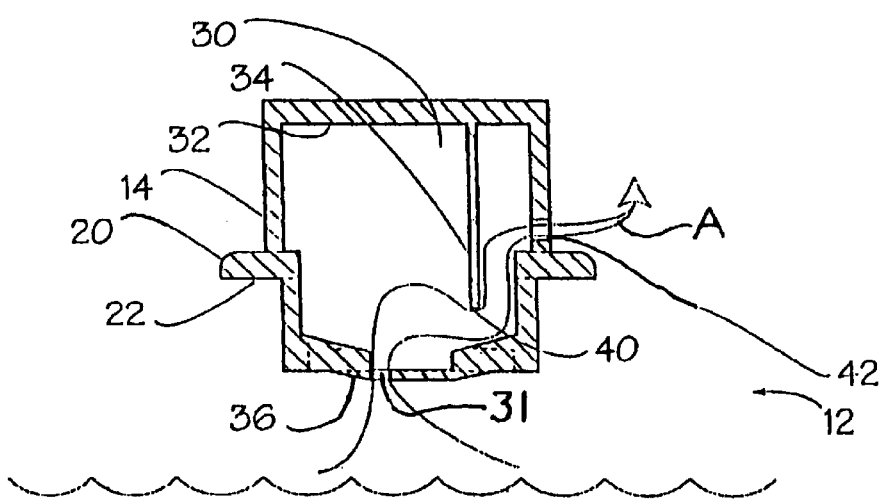
FIG. 3 is a vertical sectional elevational view taken along the lines 3—3 of FIG. 2 showing the interior construction of a typical, conventional battery cap.
Figure 4:
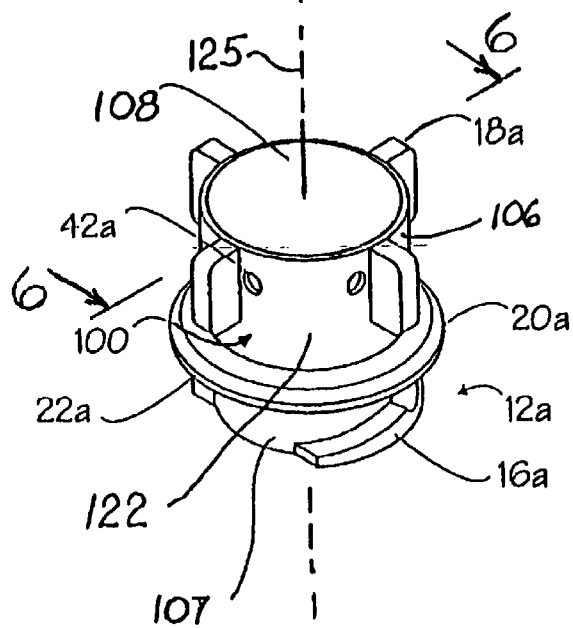
FIG. 4 is a perspective view of a preferred embodiment of an improved battery cap according to the present invention in which the external features of the improved cap of the invention are visible.

The interior of the battery cap 12 is illustrated in FIG. 3. As shown, the battery cap 12 is hollow and defines within its structure a generally cylindrical chamber or cavity 30 having an off-center, small opening 31 in a bottom plate 36 at the lower extremity of the cap structure 12. A baffle 34 extends downwardly from an upper, inner surface 32 of the roof of the chamber 30.

When the battery cap 12 is properly installed in a fill opening in the battery 10, hydrogen gas generated within the battery cells of the battery 10 flows upwardly, through the opening 31 in the battery cap floor 36 and into the hollow battery cap chamber 30. From the chamber 30 the hydrogen gas flows under the lower edge 40 of the baffle 34, back upwardly and out of the discharge hole 42 in the side wall of the upper portion 14 of the cap 12. The general path of gas flowing through the battery cap 12 is depicted by the arrow A in FIG. 3.

It should be noted that the conventional battery cap 12 of the type shown for a deep cycle battery 10 does not include a flame arrester. Consequently, under conditions of heavy charging or heavy discharging of the battery 10 during which a substantial amount of out-gassing from the battery cells occurs, a spark or flame can ignite the explosive mixture of hydrogen gas and air within the battery 10. If this occurs the battery 10 will explode.

Drawing FIGS. 4–8 illustrate an improved battery cap 12a according to the invention. The battery cap 12a is formed with a hollow, tubular body 100 having an upper end 106 and a lower end 107. The upper end 106 defines an expansive, circular mouth opening 134. The tubular body 100 is formed with a generally cylindrical, tubular annular wall 122 that defines a vertical axis of longitudinal alignment 125. The tubular annular wall 122 has an interior surface 130 and an exterior surface 132.

The wall 122 also has external radial projections 16a for engaging a battery fill port in a conventional manner. The projections 16a are shaped like and operate like the projections 16 of the conventional battery cap 12. The upper portion of the tubular body 100 also includes four radially projecting wings 18a that facilitate gripping and twisting the battery cap 12a with one's fingers to install or remove the battery cap 12a from a battery cell fill opening. This feature is also conventional.

The internal structure of the battery cap 12a is quite unique and is best illustrated in drawing FIGS. 5 through 8. As shown in those drawing figures an inwardly projecting radial, annular rib 128 is defined on the inner surface of the wall 122. The rib 128 extends radially inwardly a distance of 0.025 inches encircling the interior 130 of the wall 122 at the upper end 106 of the tubular body 100 near the upper extremity thereof. Also in the upper and 106 of the tubular body 100, but below the annular rib 128, there are a pair of gas escape ports 42a defined through the structure of the wall 122. The gas escape ports 42a are each 0.12 inches in diameter and are spaced laterally from each other a distance of 0.35 inches, center to center.

Figure 6:
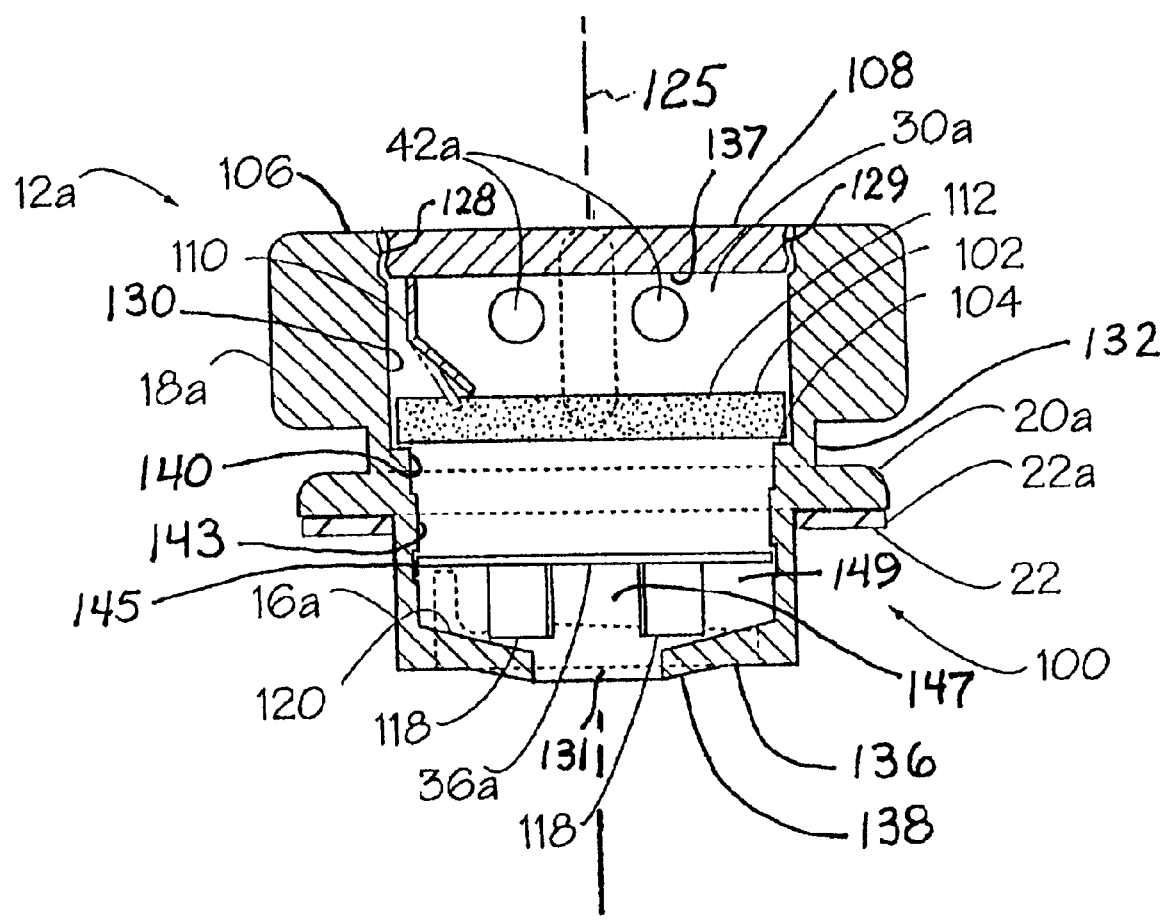
FIG. 6 is a sectional elevational view taken along the lines 6—6 of FIG. 4 showing the internal details of construction of the preferred embodiment of the battery cap of the invention illustrated.
Figure 7:
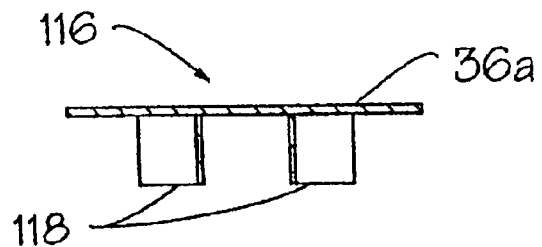
FIG. 7 is an elevational view of the diverter employed in the preferred embodiment of the battery cap illustrated, shown in isolation.

The tubular body 100 defines an annular, transverse floor 136 that extends radially inwardly from the wall 122 at the lower end 107 of the tubular body 100. As illustrated in FIG. 6, the floor 136 includes a central, annular convex downwardly projecting portion 138 having a lower, exposed end face that bulges downwardly. The outer diameter of the central, convex downwardly projecting portion 138 is preferably 0.57 inches. The upper, interior surface 120 of the floor 136 is inclined downwardly and inwardly from the wall 122 and terminates at a central, axial opening 131 that is formed in the convex downwardly bulging end face of the central annular floor portion 138. The central opening 131 is relatively large and is centered on the axis of longitudinal alignment 125, as contrasted with the opening 31 in the conventional battery cap 12. The central opening 131 preferably has a diameter of 0.30 inches At its interior surface 130 the wall 122 defines a radially inwardly extending projection 140. At the demarcation between the inwardly extending projection 140 and the wider diameter portion of the interior wall surface 130 immediately above the projection 140 a flat, annular flame arrester seat 104 is defined. The flame arrester seat 104 is formed as an upwardly facing annular bearing ledge about 0.055 inches in width. The internal diameter of the cavity surrounded by the interior wall surface 130 immediately above the bearing ledge 104 is preferably 0.975 inches. The internal diameter of the cavity surrounded by the interior wall surface 130 at the projection 140 immediately below the flame arrester seat bearing ledge 104 is preferably 0.92 inches.

Below the projection 140 there is a further radially inwardly projecting diverter engaging ring 143. The internal diameter of the cavity defined by the interior wall surface 130 at the diverter engaging ring 143 is preferably 0.844 inches. Below the diverter engaging ring 143 the interior wall surface 130 of the wall 122 widens to form a groove 145, at which the interior diameter encompassed by the interior wall surface 130 is preferably 0.92 inches.

Figure 5:
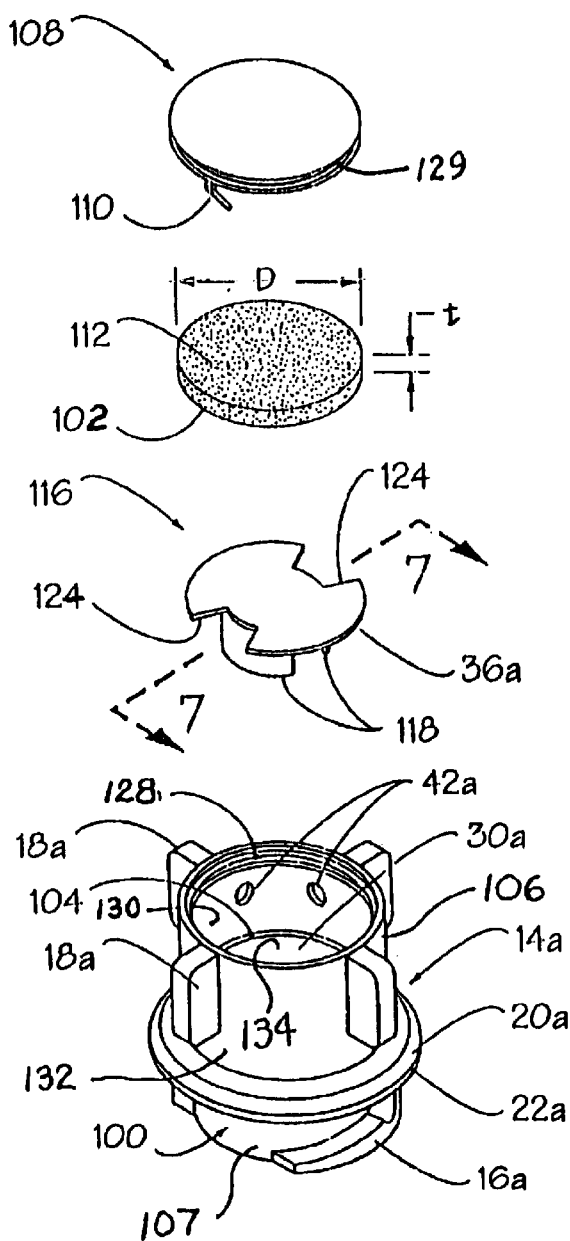
FIG. 5 is an exploded perspective view of the embodiment of the battery cap of the invention shown in FIG. 4.

The diverter 116 is formed generally in the shape of a round table supported by legs having an arcuate cross-sectional configuration. Specifically, the diverter 116 has a flat, horizontally disposed, generally disc shaped plate or partition 36a, the circumference of which is basically circular, but with a pair of diametrically opposed notches 124 formed in the peripheral edge of the plate 36a, as best illustrated in FIG. 5. The spaces between the structure of the plate 36a at the notches 124 and the interior surface 130 of the wall 122 at the groove 145 immediately below the inwardly projecting diverter engaging ring 143 serve as peripheral fluid passageways defined through the transverse partition or plate 36a.

The diverter 116 has a pair of legs 118 which are of arcuate cross-section each extending in an arc of 120 degrees centered on the longitudinal axis of alignment 125. The diameter of the interior arcuate surfaces of the legs 118 relative to the axis of longitudinal alignment 125 is preferably the same as the diameter of the central opening 131, but can be slightly greater. The legs 118 extend downwardly from the undersurface of the plate 36a in perpendicular orientation relative thereto a distance of about 0.64 inches. The legs 118 thereby define radial fluid passage gaps 147 therebetween. As illustrated, the radial fluid passage gaps 147 are angularly offset ninety degrees from the peripheral fluid passageways above formed by the notches 124 in the plate 36a.

The diverter 116 is formed of molded plastic which is stiff, but sufficiently resilient so that the peripheral edge of the plate 36a will flex slightly as the diverter 116 is pressed down into the structure of the tubular body 100 toward the floor 136. This flexure is sufficient to allow the plate 36a to clear the diverter engaging ring 143 in the interior wall surface 130 of the wall 122. As the lower extremities of the legs 118 make contact with the upper surface 120 of the floor 136 the peripheral edge of the plate 36a resides in the groove 145 beneath the diverter engaging ring 143. The diverter 116 is thereby entrapped in the diverter cavity 149 defined within the hollow structure of the tubular body 100 beneath the diverter engaging ring 143 with the lower extremities of the legs 118 in contact with the upper surface 120 of the floor 136. The diverter legs 118 thereby rest upon the floor 136 of the tubular body 100 and the legs 118 straddle the central fluid passage opening 131 in the center of the floor 136.

A microporous flame arrester disc 102 is installed in the upper portion of the hollow enclosure 30a defined within the tubular battery cap body 100. The hydrophobic microporous filter disc 102 rests upon the bearing ledge 104 that serves as a flame arrester seat. The circular, peripheral edge of the microporous filter disc 102 resides in contact with the interior surface 130 of the upright wall 122 throughout its circumference so that the filter disc 102 forms a spark arrester or flame arrester. The filter disc 102 thereby provides a barrier to ignition of explosive gases beneath its structure.

The filter disc 102 is relatively large so that it does not become saturated with contaminants. The filter disc 102 preferably has a diameter D of about one inch and a thickness t of about ⅛ of an inch, as shown in FIG. 5. The filter disc 102 is preferably formed from an acid-resistant polymeric material, such as polypropylene, and has a pore size (diameter) of between about 20 to about 200 microns. This pore size permits the slow diffusion of hydrogen and other gases discharged from the battery 10 through its structure, while at the same time preventing the passage through its structure of larger molecules of liquid, such as battery acid.

The upper mouth opening 134 of the tubular battery cap body 100 is closed by a thin cover, which is a top end closure disc 108. As previously indicated, the upper end 106 of the tubular body 100 is provided with a radially inwardly projecting annular rib 128 that serves as a first snap fit engaging element. The top end closure disc 108 has a corresponding groove 129 defined in its outer, peripheral edge, which serves as a second snap fit engaging element. The first and second snap fit engaging elements 128 and 129 are engaged with each other at the top end 106 of the tubular body 100 to hold the top end closure disc 108 engaged with the wall 122 to block the circular mouth opening 134 of the tubular body 100.

The top end closure disc 108 has a concealed inner surface 137 facing the flame arrester disc 102. The top end closure disc 108 is also provided with a slender finger 110 depending from the concealed inner surface 137 toward the flame arrester disc 102. The tip of the finger 110 resides in contact with the flame arrester 102 when the snap fit engaging elements 128 and 129 are engaged with each other. When the top end closure disc 108 is installed in the upper and 106 of the body 100 of the battery cap 12a the lower end of the finger 110 bears against the upper surface 112 of the flame arrester disc 102 to retain the disc 102 in place, as illustrated in FIG. 6. The finger 110 also serves the purpose of limiting the extent to which the top end closure disc 108 can be pushed into the hollow enclosure 30a defined within the tubular body 100.

Figure 8:
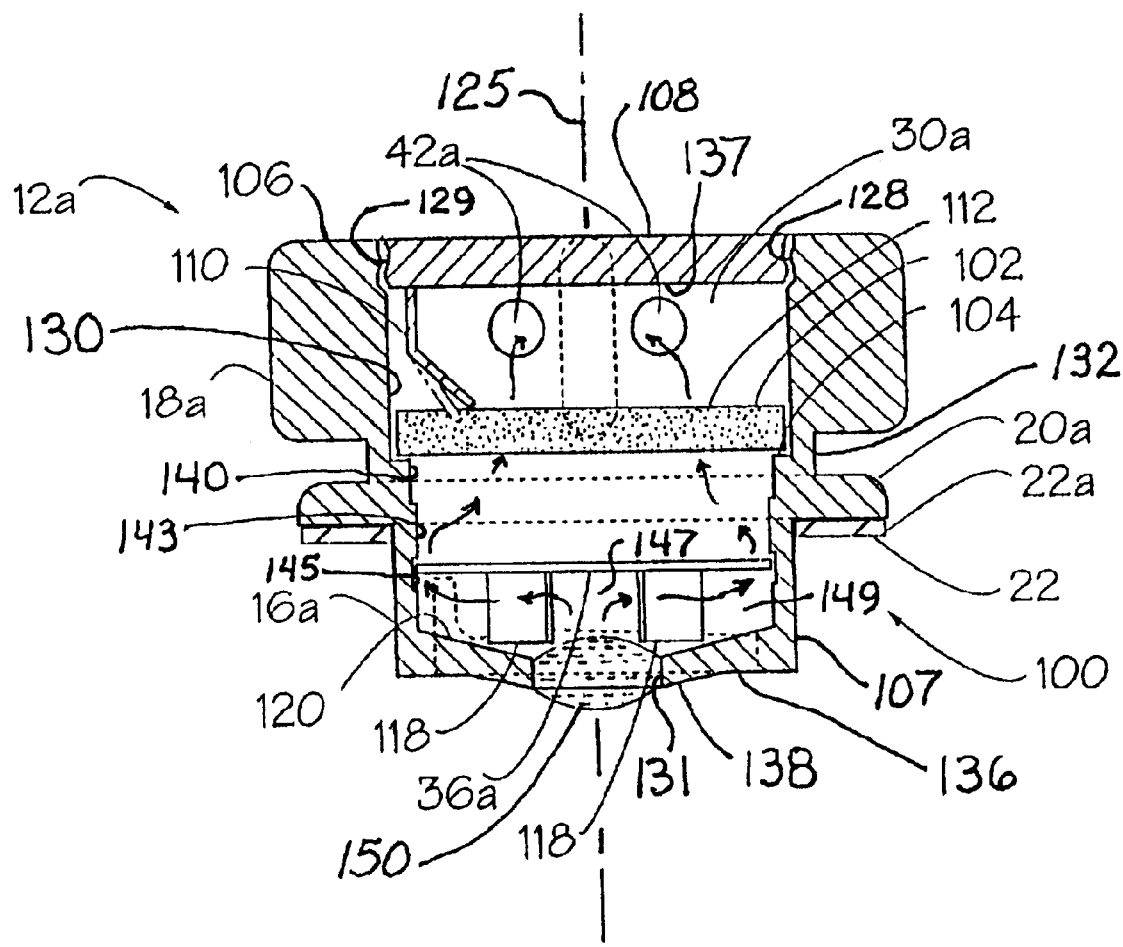
FIG. 8 is a sectional elevational view similar to FIG. 6 and illustrating the operation, fluid flow paths, and fluid dynamics within the battery cap of the invention.

FIG. 8 illustrates the fluid dynamics and flow that occurs within a battery 10 employing the battery caps 12a according to the invention. The legs 118 of the diverter 36a are relatively short so that together with the underside of the plate 116 the legs 118 form a cage or enclosure above the relatively large opening 131 in the floor 136. The openings between the legs 118 that form the radial fluid passage gaps 147 provide a path of gas flow that ultimately leads to the peripheral fluid passageways formed by the notches 124 in the diverter plate 116. A circuitous pathway is thereby defined that allows gas to escape through the porous disc 102 and out from the battery cap 12a through the pair of laterally spaced gas escape ports 42a that are defined through the wall 122 below the upper mouth opening 134.

During the normal course of charging and discharging, and also during vibration that occurs as a vehicle in which the deep cycle battery 10 is installed travels, aqueous sulfuric acid electrolyte, contaminated with particulate matter or "mud" as previously described, will spew directly on the underside of the diverter plate 36a through the large opening 131 in the center of the floor 136 of the battery cap body 100. The diverter plate 36a serves as a shield to protect the filter disc 102 from spewing electrolyte that enters the central opening 131.

When the electrolyte is spewed against the underside of the diverter plate 36a it tends to fall back by the force of gravity. However, due to the partial confinement formed by the undersurface of the plate 116, the interior, concave surfaces of the legs 118 and the downwardly inclined inner surface 120 of the floor 136, sufficient surface tension is created so that a drop 150 of the electrolyte very frequently lodges in the central opening 131. This quantity 150 of electrolyte is held in suspension lodged in the central opening 131 and forms a lenticular bubble shape that protrudes from the relatively large opening 131 in the downwardly bulging central portion 138 of the battery cap floor 136. This lenticular bubble 150 thereby forms a temporary low-pressure seal at the bottom of the battery cap 12a.

The electrolyte drop 150 is held in suspension lodged in the opening 131 as a result of a critical balance of gravity and surface tension. This small amount of aqueous sulfuric acid electrolyte remains suspended in the opening 131 for a time, thereby temporarily blocking the opening 131. The surface tension holding the drop 150 in the opening 131 is produced by the interactive fluid pressures that result from the presence of the relatively large micropore disc 102, the pair of laterally spaced gas escape ports 42a, the diverter plate 116, the short legs 118 and the relatively large opening 131 in the center of the floor 136 of the cap 12a. Thus, unlike conventional battery caps 12, the lead-acid safety battery cap of the invention does not rely exclusively upon gravity to directly returned electrolyte into the battery cell.

The electrolyte that is held in suspension and which forms the lenticular bubble 150 at the bottom of the cap 12a acts as a shield and physical barrier that protects the micropore disc 102 from spewing aqueous sulfuric acid electrolyte and from contaminants carried with rising gas bubbles. In addition to protecting the micropore disc 102, the lenticular bubble 150 significantly improves the performance of the battery cap 12a to prevent acid from being spewed into the battery compartment.

All battery caps must vent the gas produced in the battery to the outside atmosphere. Unlike conventional battery caps of the type depicted at 12 in FIGS. 1–3, however, the internal structure of the battery cap 12a of the present invention causes a lenticular bubble to form at the bottom of the cap 12a. This lenticular bubble formed by the electrolyte drop 150 serves as a low-pressure seal that is held in place by a critical balance between gravity and surface tension.

The gas produced in the battery cell is liberated to the outside atmosphere during the natural process of gas pressure fluctuation, vibration and agitation that upsets the critical balance of gravity and surface tension. At the moment at which this balance is upset or disturbed, gravity prevails and the lenticular bubble formed by the electrolyte drop 150 falls back from the opening 131 into the battery cell. Also, there is a natural cohesion of the electrolyte within the hollow battery cap that exists. As the electrolyte drop 150 is dislodged from the opening 131 and begins to fall, the natural cohesion of the quantity of electrolyte is such that the entire quantity of electrolyte within the battery cap 12a drains quickly completely out of the hollow enclosure 30a formed within the tubular body 100. The evacuation of electrolyte from the hollow enclosure 30a of the battery cap 12a thereupon provides a clear and unobstructed path for gas to escape. That is, once the electrolyte drop 150 is dislodged from the opening 131, drawing with it any other quantity of electrolyte remaining within the hollow enclosure 30a of the cap 12a, gas is free to flow out of the battery cap 12a.

The path of gas flow venting to the atmosphere from the battery cell is up through the opening 131, through the radial fluid passage gaps 147 between the legs 118, across the undersurface of the diverter plate 116, up through the peripheral fluid passageways formed by the notches 124, through the micropore filter 102 and out to the atmosphere through the pair of gas escape ports 42a. The internal structure of the battery cap 12a is such that there is a cyclic recurring process of fluid dynamics alternating between a fluid gas seal and free venting of the gas to atmosphere.

Another important aspect of the lead-acid safety battery cap of the invention is the design of the component pieces for simplicity and ease in manufacturing and assembly. Unlike other prior art battery caps the battery cap 12a does not require sonic welding, spin welding, or adhesive for assembly. To the contrary, all the component parts of the battery cap 12a can be quickly and easily assembled together with snap fitting engagement between critical components.

Certain key components of the battery cap 12a are held or sealed in place by an interference fit, that is, a press fit. The diverter 116 is press fitted into the hollow diverter cavity 149 of the tubular body 100 as it is forced past the diverter retaining ring 143. The micropore filter 102 seats upon the bearing ledge 104 and is held in position by the finger 110. The last component of the battery cap 12a to be assembled is the top end closure disc 108. The finger 110 assists in the proper positioning of the top end closure disc 108 since its interaction with the micropore filter 102 tends to prevent the top end closure disc 108 from being pressed too far into the mouth opening 134 once the snap fitting elements 128 and 129 have been engaged with each other. The construction of the battery cap 12a allows quick manual assembly without any tools or machinery whatsoever.

Undoubtedly, numerous variations and modifications of the invention will become readily apparent to those familiar with battery cap construction for lead-acid electrical storage batteries. Accordingly, the scope of the invention should not be construed as limited to the specific embodiment depicted and described, but rather is defined in the claims appended hereto.

What is claimed is:

1. A battery cap for insertion into a fill port of a cell of a lead-acid electrical storage battery comprising:

a hollow, tubular body having upper and lower ends and formed with an upright, tubular annular wall with external radial projection for engaging said fill port, an inwardly projecting rib extending radially inwardly from said wall at said upper end of said tubular body, and said upper end of said tubular body defines an expansive mouth opening, an annular, transverse floor extending radially inwardly from said wall at said lower end of said body and including a central, annular convex downwardly projecting portion that defines a central fluid passage opening therein, and said tubular wall defines a radially inwardly projecting flame arrester seat spaced from both said upper and lower ends of said body, and a pair of laterally spaced gas escape ports are defined in said tubular wall between said flame arrester seat and said mouth opening, a diverter located within said tubular body and formed with a transverse partition extending across the entire area encompassed within said tubular wall and having an undersurface, and peripheral fluid passageways are defined through said transverse partition, and a plurality of legs each formed with an arcuate cross section extending downwardly from said transverse partition perpendicular to said undersurface thereof, and said legs define radial fluid passage gaps therebetween, and said legs rest upon said floor of said tubular body, whereby said legs straddle said central fluid passage opening in said floor, a flat, disc shaped flame arrester extending across the interior of said tubular body and contacting said tubular wall throughout its circumference, and a top end closure with a groove about its periphery, whereby said peripheral groove of said top end closure is engaged with said inwardly projecting rib at said tap end of said tubular body in a snap fit engagement therewith.

2. A battery cap according to claim 1 wherein said wall defines a radially inwardly projecting diverter engaging ring between said flame arrester seat and said floor and said diverter is formed of plastic and said transverse partition is captured and held by said diverter engaging ring between said diverter engaging ring and said floor.

3. A battery fill cap according to claim 2 wherein said diverter partition has a disc shaped configuration with diametrically opposed notches therein, whereby said notches form said peripheral fluid passageways between the structure of said partition and said wall of said tubular body.

4. A battery fill cap according to claim 3 wherein said top end closure has an exposed outer face and a concealed inner face and a finger projecting from said concealed inner face that resides in contact with said flame arrester when said top end closure is in snap fit engagement with said tubular body.

5. A battery cap according to claim 1 wherein said flame arrester seat is formed as a bearing ledge extending about the inner circumference of said tubular annular wall and facing said mouth opening.

6. A battery cap according to claim 1 wherein said pair of gas escape ports are located side-by-side in angularly spaced separation from each other and at the same distance from said top end closure.

7. A battery cap for insertion into a fill port of a cell of a lead-acid electrical storage battery comprising:

a hollow, barrel shaped body having upper and lower ends and formed with an upright, annular wall having an exterior configured to engage said fill port, a first snap fit engaging element on its inner surface at said upper end of said body, and said upper end of said body defines a circular mouth opening, an annular, transverse floor extending radially inwardly from said wall at said lower end of said body and including a central, annular downwardly bulging portion perforated by a central fluid passage opening therein, and said wall defines a radially inwardly projecting flame arrester seat located between said upper and lower ends of said body, and said wall further defines a plurality of gas escape ports beneath said mouth opening, a diverter located within said body and formed with a transverse plate having fluid passageways formed at its periphery, and a plurality of upright plate supports are formed as segments of an upright hollow cylinder, and said plate supports extend downwardly from said transverse plate to define radial fluid passage gaps therebetween, and said plate supports rest upon said floor of said body and straddle said central, fluid passage opening and hold said transverse plate directly above said downwardly bulging portion of said floor at a location spaced above said floor, a porous flame arrester disposed upon said flame arrester seat and extending across the interior of said tubular body and residing in contact with the interior surface of said upright wall throughout its circumference, and a top end closure disc having a second snap fit engaging element at its periphery, and said first and second snap fit engaging elements are engaged with each other at said top end of said body to bold said top end closure disc engaged with said wall to block said circular mouth opening of said body.

8. A battery cap according to claim 7 wherein the interior of said wall is formed with a radially inwardly projecting diverter engaging ring located between said floor and said flame arrester seat, the area therebetween forming a diverter cavity, and said diverter is formed of plastic and is entrapped in said diverter cavity by said diverter engaging ring.

9. A battery cap according to claim 8 wherein said plate has a disc shaped configuration with a pair of diametrically opposed notches in its periphery, whereby the spaces between the structure of said plate at said notches and said the interior of said well form said peripheral fluid passageways.

10. A battery cap according to claim 9 wherein said top end closure disc has a concealed inner surface facing said flame arrester and a finger projecting from said concealed inner surface toward said flame arrester the tip of which resides in contact with said flame arrester when said snap fit engaging elements are engaged with each other.

11. A battery cap according to claim 7 wherein said flame arrester sent is formed as a bearing ledge by a radially inwardly extending projection from said interior of said wall.

12. A battery cap according to claim 7 wherein said plurality of gas ports consist of a pair of gas escape ports located at the same longitudinal distance along said axis of longitudinal alignment from said top end closure disc, side-by-side in said wall and between said top end closure disc and said flame arrester.

13. A battery cap for a fill port of a cell of a lead-acid electrical storage battery comprising:

a hollow, tubular body formed with top and bottom ends and an upright tubular wall having an exterior and having and interior surrounding a central axis of longitudinal alignment, and said exterior of said wall is configured to engage said fill port, and the upper extremity of said interior of said wall forms an upper mouth opening at said top end of said tubular body and a lower end closure floor is formed at said bottom end of said body at the lower extremity of said wall, and a pair of laterally spaced gas escape ports are defined through said wall below said upper mouth opening and said interior of said wall forms a flame arrester seat located between said floor and said pair of gas escape ports, and said floor has a central, annular portion centered on said axis of longitudinal alignment and having a convex downwardly bulging exterior end face, and said central annular portion of said floor has a central, circular fluid passage opening therethrough, a diverter located within said tubular body and having a plate oriented perpendicular to said axis of longitudinal alignment and peripheral fluid passageways at its periphery and upright supports projecting downwardly from said plate, and said supports are shaped as arcuately curved segments of an upright cylinder centered on said axis of longitudinal alignment and said upright supports rest upon said floor at said central annular portion thereof to bold said plate in spaced separation from said floor directly above said central annular portion of said floor, and said supports define a pair of diametrically opposed, radial fluid passage gaps therebetween, a transverse, porous flame arrester located above said diverter and below said pair of gas escape ports and residing in contact with said wall throughout said interior thereof, and a body end closure that blocks said upper mouth opening and is secured to said wall at said top end of said body in interlocking engagement therewith.

14. A battery cap according to claim 13 wherein said the interior of said wall includes a radially inwardly directed diverter retaining projection toward said axis of longitudinal alignment located between said floor and said flame arrester seat, and said diverter is formed of plastic and said plate extends radially outwardly from said axis of longitudinal alignment to said interior of said wall of said tubular body at a location just beneath said diverter retaining projection, whereby said diverter is captured between said diverter retaining projection and said floor.

15. A battery till cap according to claim 14 wherein said plate has a peripheral edge that is circular in shape with notched indentations therein, whereby the separation between said interior of said wall and said peripheral edge of said plate at said notched indentations forms said peripheral fluid passageways.

16. A battery fill cap according to claim 15 wherein said top end closure has an inner face facing said flame arrester and a finger extending longitudinally from said inner face, and said finger contacts and bears against said flame arrester when said top end closure is engaged with said wall in interlocking engagement therewith.

17. A battery cap according to claim 13 wherein said flame arrester seat is formed by a bearing ledge seating ring defined on said interior of said wall.

18. A battery cap according to claim 13 wherein said pair of gas escape ports are located side-by-side, angularly offset from each other relative to said axis of longitudinal alignment.

* * * * *